US010241925B2

(12) United States Patent
Mirza et al.

(10) Patent No.: US 10,241,925 B2
(45) Date of Patent: Mar. 26, 2019

(54) SELECTING A DEFAULT PAGE SIZE IN A VARIABLE PAGE SIZE TLB

(71) Applicant: ATI Technologies ULC, Markham (CA)

(72) Inventors: Jimshed Mirza, Toronto (CA); Anthony Chan, Richmond Hill (CA); Edwin Chi Yeung Pang, Markham (CA)

(73) Assignee: ATI Technologies ULC, Markham (CA)

( * ) Notice: Subject to any disclaimer, the term of this patent is extended or adjusted under 35 U.S.C. 154(b) by 54 days.

(21) Appl. No.: 15/433,560

(22) Filed: Feb. 15, 2017

(65) Prior Publication Data
US 2018/0232316 A1    Aug. 16, 2018

(51) Int. Cl.
*G06F 12/10* (2016.01)
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/657* (2013.01); *G06F 2212/68* (2013.01)

(58) Field of Classification Search
CPC ............ G06F 12/1027; G06F 12/1009; G06F 12/0811; G06F 12/109; G06F 12/1016; G06F 12/0897; G06F 12/10; G06F 2212/684; G06F 2212/652; G06F 2212/681; G06F 2212/657; G06F 2212/152; G06F 2212/651; G06F 2212/68
See application file for complete search history.

(56) References Cited

U.S. PATENT DOCUMENTS

| 5,454,091 A   | 9/1995 | Sites et al. |
| 5,526,504 A * | 6/1996 | Hsu ..................... G06F 12/1027 711/207 |
| 5,752,275 A * | 5/1998 | Hammond .......... G06F 12/1027 711/128 |

(Continued)

OTHER PUBLICATIONS

Frigo, et al., "FFTW: An Adaptive Software Architecture for the FFT", Proceedings of the 1998 IEEE International Conference on Acoustics, Speech and Signal Processing, May 15, 2998, 4 pages.

(Continued)

*Primary Examiner* — Hiep T Nguyen
(74) *Attorney, Agent, or Firm* — Meyertons Hood Kivlin Kowert and Goetzel PC; Rory D. Rankin (57) ABSTRACT

Systems, apparatuses, and methods for selecting default page sizes in a variable page size translation lookaside buffer (TLB) are disclosed. In one embodiment, a system includes at least one processor, a memory subsystem, and a first TLB. The first TLB is configured to allocate a first entry for a first request responsive to detecting a miss for the first request in the first TLB. Prior to determining a page size targeted by the first request, the first TLB specifies, in the first entry, that the first request targets a page of a first page size. Responsive to determining that the first request actually targets a second page size, the first TLB reissues the first request with an indication that the first request targets the second page size. On the reissue, the first TLB allocates a second entry and specifies the second page size for the first request.

20 Claims, 7 Drawing Sheets

(56) References Cited

U.S. PATENT DOCUMENTS

| | | | |
|---|---|---|---|
| 5,907,867 A * | 5/1999 | Shinbo | G06F 12/1027 |
| | | | 711/207 |
| 6,112,285 A | 8/2000 | Ganapathy et al. | |
| 6,567,900 B1 | 5/2003 | Kessler | |
| 7,437,529 B2 | 10/2008 | Burugula et al. | |
| 7,747,838 B2 | 6/2010 | Hepkin et al. | |
| 7,793,070 B2 | 9/2010 | Stecher | |
| 7,805,587 B1 | 9/2010 | Van Dyke et al. | |
| 7,873,792 B2 | 1/2011 | Anand et al. | |
| 8,195,917 B2 | 6/2012 | Hohmuth et al. | |
| 8,429,377 B2 * | 4/2013 | Chen | G06F 12/1027 |
| | | | 711/206 |
| 2002/0133685 A1 * | 9/2002 | Kalyanasundharam | |
| | | | G06F 12/1027 |
| | | | 711/207 |
| 2003/0014609 A1 | 1/2003 | Kissell | |
| 2004/0117594 A1 | 6/2004 | Vanderspek | |
| 2006/0069899 A1 | 3/2006 | Schoinas et al. | |
| 2006/0075146 A1 | 4/2006 | Schoinas et al. | |
| 2006/0174053 A1 | 8/2006 | Anderson | |
| 2007/0067604 A1 | 3/2007 | Elnozahy et al. | |
| 2007/0180215 A1 | 8/2007 | Cascaval et al. | |
| 2008/0288742 A1 | 11/2008 | Hepkin et al. | |
| 2009/0013149 A1 | 1/2009 | Uhlig et al. | |
| 2009/0019254 A1 | 1/2009 | Stecher | |
| 2009/0150624 A1 | 6/2009 | Resnick | |
| 2009/0172344 A1 | 7/2009 | Grochowski et al. | |
| 2010/0332775 A1 | 12/2010 | Kapil et al. | |
| 2011/0055458 A1 | 3/2011 | Kuehne | |
| 2011/0138149 A1 * | 6/2011 | Karlsson | G06F 12/1027 |
| | | | 711/207 |
| 2012/0059983 A1 | 3/2012 | Nellans et al. | |
| 2013/0036273 A1 | 2/2013 | Shaeffer | |
| 2013/0238874 A1 * | 9/2013 | Avudaiyappan | G06F 12/1027 |
| | | | 711/207 |
| 2013/0238875 A1 * | 9/2013 | Ramaraju | G06F 12/1027 |
| | | | 711/207 |
| 2016/0048327 A1 | 2/2016 | Jayasena et al. | |
| 2018/0046583 A1 * | 2/2018 | Bybell | G06F 12/1027 |
| 2018/0074715 A1 | 3/2018 | Farmahini-Farahani et al. | |

OTHER PUBLICATIONS

Volos, et al., "BuMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awasthi, et al., "Prediction Based DRAM Row-Buffer Management in the Many-Core Era", International Conference on Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

International Search Report and Written Opinion in International Application No. PCT/US10/40625, dated Aug. 30, 2010, 8 pages.

Lim et al, "Disaggregated Memory for Expansion and Sharing in Blade Servers", Proceedings of the 36th Annual International Symposium on Computer Architecture, Jun. 29, pp. 267-278, https://web.eecs.umich.edu/~twenisch/papers/isca09-disaggregate.pdf. [Retreived Jun. 22, 2018].

Jayasena et al., U.S. Appl. No. 15/441,532, entitled "Per-Page Control of Physical Address Space Distribution Among Memory Modules", filed Feb. 24, 2017, 34 pages.

Non-Final Office Action in U.S. Appl. No. 15/441,532, dated Mar. 22, 2018, 18 pages.

Yoon et al, "Adaptive Granularity Memory Systems: A Tradeoff between Storage Efficiency and Throughput", 2011 Symposium on Computer Architecture (ISCA '11 ), Jun. 4-8, 2011, San Jose, California, pp. 295-306.

Final Office Action in U.S. Appl. No. 15/441,532, dated Sep. 13, 2018, 11 pages.

* cited by examiner

SELECTING A DEFAULT PAGE SIZE IN A VARIABLE PAGE SIZE TLB

BACKGROUND

Description of the Related Art

Many computing devices use a virtual memory technique for handling data accesses by programs being executed on the devices. A virtual memory page-translation mechanism enables system software to create separate address spaces for each process or application. These address spaces are known as virtual address spaces. The system software uses the paging mechanism to selectively map individual pages of physical memory into the virtual address space using a set of hierarchical address-translation tables known collectively as page tables. Virtual memory can be implemented with any processor, including, but not limited to, a central processing unit (CPU), a graphics processing unit (GPU), and an accelerated processing unit (APU).

When data is accessed by a program, a block of memory of a given size (e.g., 4 kB) that includes the data, called a "page" of memory, is copied from mass storage (e.g., a disk drive or semiconductor memory) to an available physical location in a main memory in the computing device. Some systems have multiple different page sizes stored in memory. Rather than having programs manage the physical locations of the pages, a memory management unit in the computing device manages the physical locations of the pages. Instead of using addresses based on the physical locations of pages (or "physical addresses") for accessing memory, the programs access memory using "virtual addresses" in "virtual address spaces," which are local address spaces that are specific to corresponding programs. From a program's perspective, virtual addresses indicate the actual physical addresses (i.e., physical locations) where data is stored within the pages in memory and hence memory accesses are made by programs using the virtual addresses accordingly. However, the virtual addresses do not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs.

To perform the above-described translations, the memory management unit uses a page table in memory that includes a set of translations from virtual addresses to physical addresses for pages stored in the memory. However, using the page table to translate virtual addresses to physical addresses is slow for various reasons (e.g., the size of the page table, the operations used to perform lookups for the translation). The computing device also includes a translation lookaside buffer (or "TLB"), which is a cache of virtual address to physical address translations that were previously acquired from the page table. Performing the translation from virtual address to physical address using the TLB is significantly faster than performing the translation using the page table. However, TLBs are typically limited in size due to constraints on the area that the TLB is allowed to occupy in the integrated circuits in which the TLB is fabricated. This means that the use of the TLB can be limited and some virtual address to physical address translations must still be performed using the page table.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for selecting default page sizes in a variable page size translation lookaside buffer (TLB) are disclosed herein. In one embodiment, a system includes at least one processor, a memory subsystem, and a first TLB. The first TLB is configured to allocate a first entry for a first request responsive to detecting a miss for the first request in the first TLB. Prior to determining a page size targeted by the first request, the first TLB specifies, in the first entry, that the first request targets a page of a first page size. Responsive to determining that the first request actually targets a second page size, the first TLB reissues the first request with an indication that the first request targets the second page size. On the reissue, the first TLB allocates a second entry and specifies the second page size for the first request.

Figure 1:
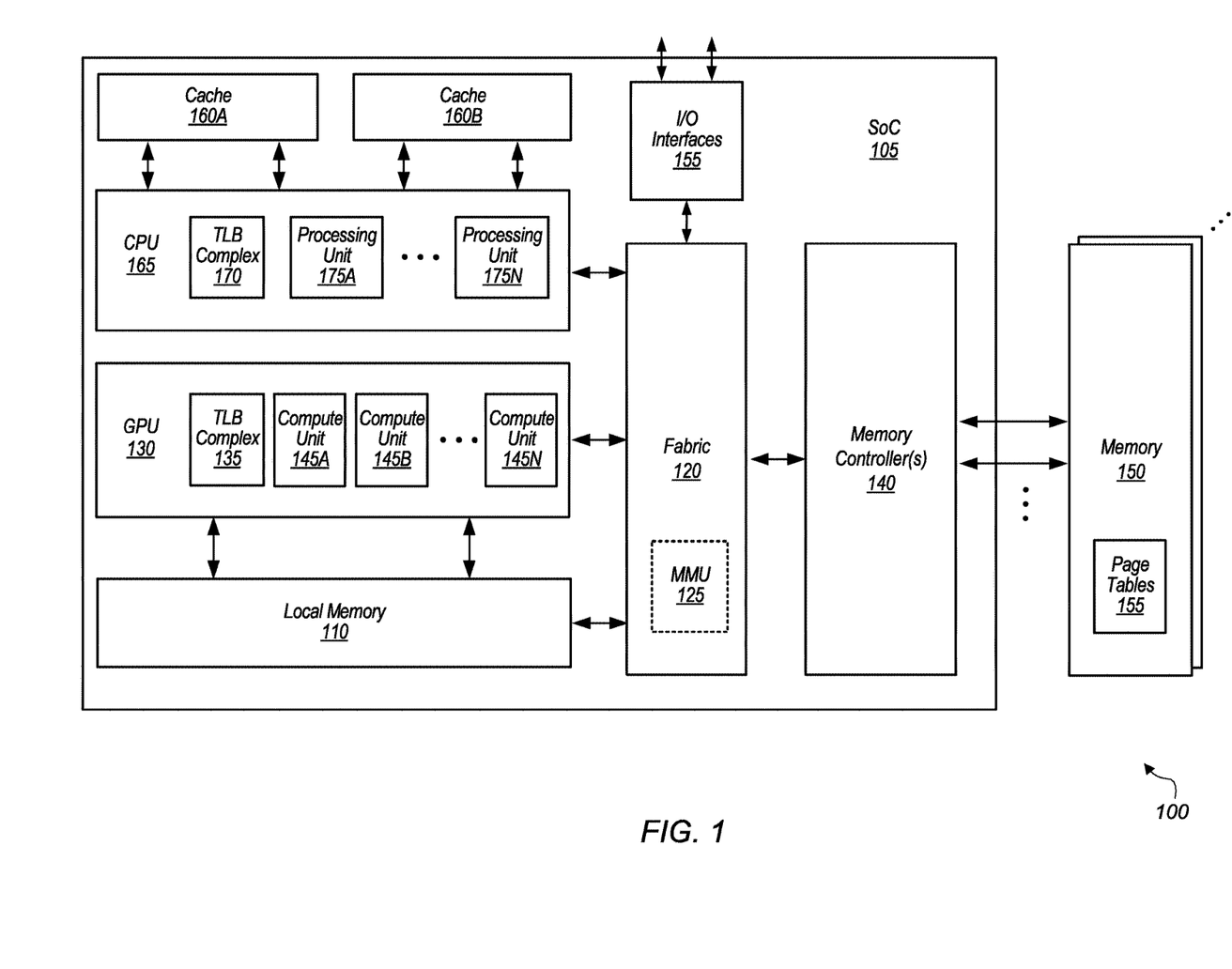
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 140. SoC 105 can also include other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP)). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of system 100, such as an operating system. Generally, software executed by processing units 175A-N during use can control the other components of system 100 to realize the desired functionality of system 100. Processing units 175A-N can also execute other software, such as application programs.

GPU 130 includes at least translation lookaside buffer (TLB) complex 135 and compute units 145A-N which are representative of any number and type of compute units that are used for graphics or general-purpose processing. GPU 130 is coupled to local memory 110 and fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 and CPU 165 use TLBs to cache mappings of virtual addresses to physical addresses for the virtual addresses that are allocated to different processes executing on these devices. These TLBs are shown as TLB complex 135 for GPU 130 and TLB complex 170 for CPU 165. Each of TLB complexes 135 and 170 includes one or more levels of TLBs. An example of one embodiment of a TLB complex is described in further detail below in the discussion associated with FIG. 2. Additional logic and levels of TLBs can also be included in memory management unit (MMU 125). While MMU 125 is shown as being part of fabric 120, it is noted that MMU 125, or portions thereof, can be placed in locations within SoC 105 in other embodiments.

In one embodiment, within TLB complexes 135 and 170, different TLBs are implemented for instructions or data. In various embodiments, multilevel TLBs can also be used. For example, in one embodiment, a relatively small and fast L1 TLB is backed up by a larger L2 TLB that requires more cycles to perform a lookup. The lookup performed by an L2 TLB is relatively fast compared to a table walk to page tables 155. Some embodiments of a TLB complex include an instruction TLB (ITLB), a level one data TLB (L1 DTLB), and a level two data TLB (L2 DTLB). Other embodiments of a TLB complex can include other configurations and/or levels of TLBs.

An address translation for a load instruction or store instruction in GPU 130 can be performed by posting a request for a virtual address translation to the L1 TLB of TLB complex 135, which returns the physical address if the virtual address is found in an entry of the L1 TLB. If the request for the virtual address translation misses in the L1 TLB, then an entry is created for the L1 TLB and the request is posted to the L2 TLB. In one embodiment, the entry in the L1 TLB specifies a default page size for the request. In one embodiment, there are two page sizes, and the default page size is the larger of the two page sizes. At least in part because of latency in processing the request to the L2 TLB, the L1 TLB will often have to wait several cycles before receiving an acknowledgment indicating whether the request hit or missed in the L2 TLB.

The L1 TLB will also receive an indication of the actual page size targeted by the request from the L2 TLB. If the actual page size matches the default page size specified in the L1 TLB entry, then the L1 TLB continues with normal processing. However, if the actual page size does not match the default page size specified in the L1 TLB entry, then the L1 TLB entry allocated for the request is invalidated and the request is retried with a flag indicating the actual page size targeted by the request. When the request is retried in the L1 TLB, a new entry is allocated for the request, with the request specifying a different default page size for the request. As used herein, the term "page" is defined as a fixed-length contiguous block of virtual memory. A "page" is also defined as a unit of data utilized for memory management by system 100. The size of a page can vary from embodiment to embodiment, and multiple different page sizes can be utilized in a single embodiment. It should be understood that the terms "memory page" and "page" are intended to represent any size of memory region.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 175A-N and/or compute units 145A-N. In some embodiments, SoC 105 includes caches 160A-B that are utilized by processing units 175A-N. In one embodiment, caches 160A-B are part of a cache subsystem including a cache controller.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
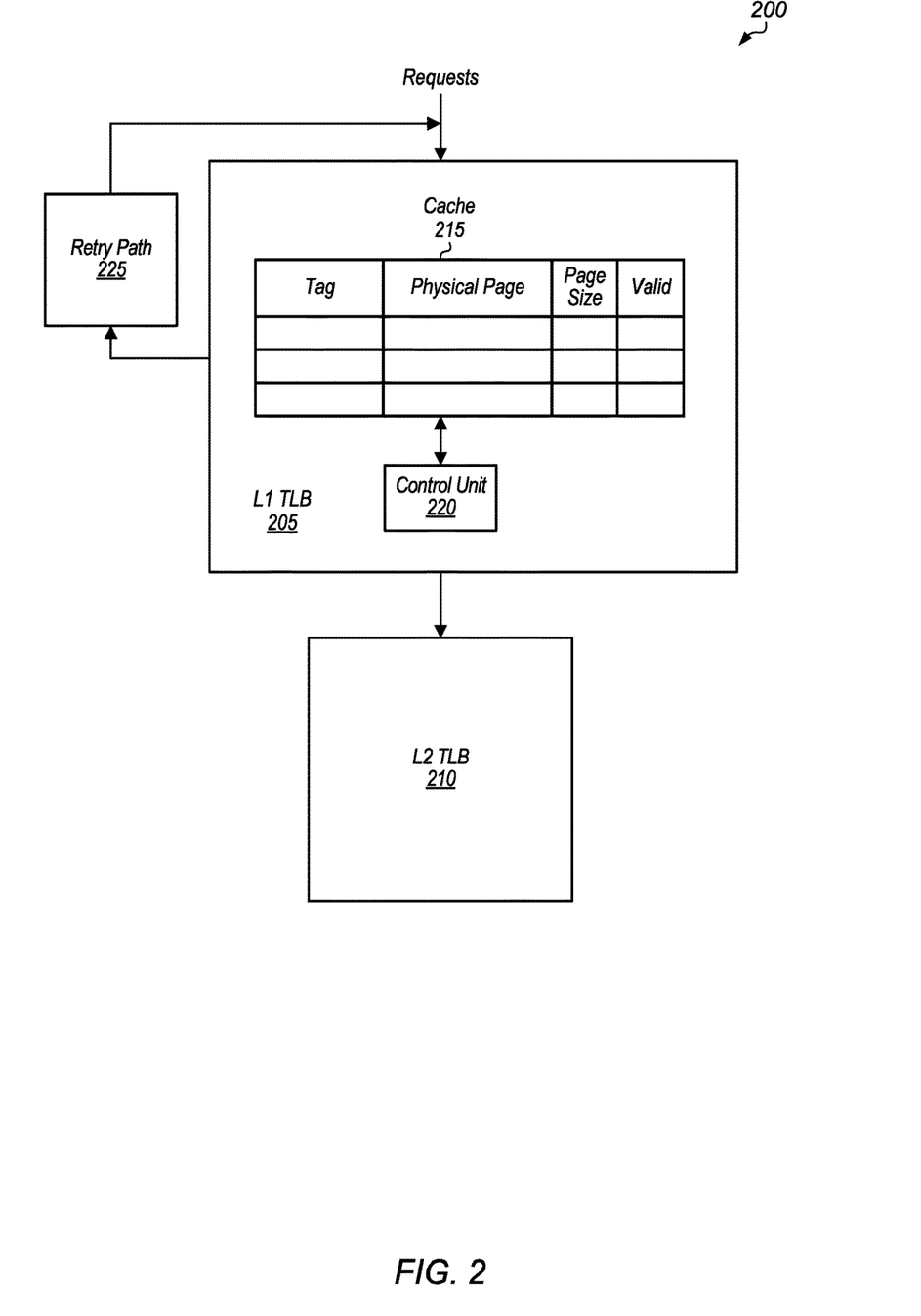
FIG. 2 is a block diagram of one embodiment of a TLB complex.

Turning now to FIG. 2, a block diagram of one embodiment of a TLB complex 200 is shown. In one embodiment, the logic of TLB complex 200 is included in TLB complexes 135 and 170 (of FIG. 1). As shown in FIG. 2, TLB 200 includes L1 TLB 205, retry path 225, and L2 TLB 210. It is noted that TLB complex 200 can also include other components which are not shown in FIG. 2 to avoid obscuring the figure. Additionally, it should be understood that the TLB complex 200 shown in FIG. 2 is merely one example of TLB complex that can be implemented. In other embodiments, other structures of TLB complexes can be utilized.

L1 TLB 205 includes at least cache 215 and control unit 220. In one embodiment, control unit 220 is configured to act as a filtering mechanism for requests received by L1 TLB 205. In one embodiment, control unit 220 implements a filtering mechanism by consolidating entries in L1 TLB 205 for requests targeting the same page in memory, resulting in a reduction in the bandwidth of requests sent to L2 TLB 210. Control unit 220 can be implemented with any suitable combination of hardware and/or software.

When a request for a translation is received by L1 TLB 205, a lookup of cache 215 is performed. Cache 215 can have any configuration and any number of entries depending on the embodiment. In one embodiment, each entry includes multiple fields including a tag field, a physical page field, a page size field, and a valid field. It is noted that each entry can also include additional information in other embodiments. If a request hits in the lookup of cache 215, then the physical page from the matching entry is utilized to perform a virtual-to-physical address translation of the virtual address of the request.

If a request misses in the lookup of cache 215, then an entry is allocated in cache 215 for the request, and then the request is sent to L2 TLB 210. When the entry is allocated for the request, a default page size is specified for the entry prior to the page size being determined. This default page size is then entered into the page size field of the entry allocated for the request. In one embodiment, the memory subsystem of the host computing system utilizes two page sizes (e.g., 64 kilobytes (KB) and 4 KB). In other embodiments, the memory subsystem utilizes other numbers of page sizes and/or other sizes of pages. In one embodiment, the default page size is the largest page size utilized by the memory subsystem. Specifying the default page size as the largest page size allows control unit 220 to more efficiently consolidate entries of overlapping requests. For example, if a page size of 64 KB is specified, subsequent requests are more likely to overlap with existing 64 KB entries, allowing these requests to use existing translations rather than sending additional requests to L2 TLB 210. On the other hand, if a page size of 4 KB is specified, it is less likely that subsequent requests will overlap with existing entries, and more requests will be forwarded to L2 TLB 210.

After a request is forwarded to L2 TLB 210 (in response to the request missing in L1 TLB 205), a translation will be returned to L1 TLB 205 at a later point in time. An indication of the actual page size will also be received by L1 TLB 205. If the actual page size matches the default page size specified in the entry allocated for the request, then the translation is used to generate a physical address for the request, and the physical page field of then entry is populated by the translation. However, if the received page size indication does not match the default page size, then the entry is invalidated by clearing the valid field. Also, the request is sent on the retry path 225 back to the input of L1 TLB 205. Additionally, a flag is generated to indicate that when the request is retried, a different default page size (i.e., the actual page size) should be specified for the new entry allocated for the request. Accordingly, when L1 TLB 205 receives the request via the retry path 225, the request will miss in cache 215 and a new entry allocated for the request will specify the correct page size for the request. In embodiments where control unit 220 is able to predict the default page size with a high degree of confidence, only a small percentage of requests will be sent on the retry path 225.

In one embodiment, a single client is coupled to TLB complex 200. For example, in one embodiment, a GPU is coupled to TLB complex 200. In this embodiment, since there is only a single client, L1 TLB 205 can use a single default page size for all requests. In another embodiment, multiple clients are coupled to TLB complex 200. In this embodiment, L1 TLB 205 determines which default page size to specify for a given request based on the client which generated the given request.

In one embodiment, control unit 220 is configured to predict which page size is most likely to be the target of a received request which misses in the lookup of cache 215. Control unit 220 then specifies this predicted page size as the default page size of the entry allocated for the request. In one embodiment, the prediction is generated based on the client which generated the request. In another embodiment, the prediction is generated based on the virtual address of the request. In other embodiments, the prediction can be generated based on one or more additional factors.

Figure 3:
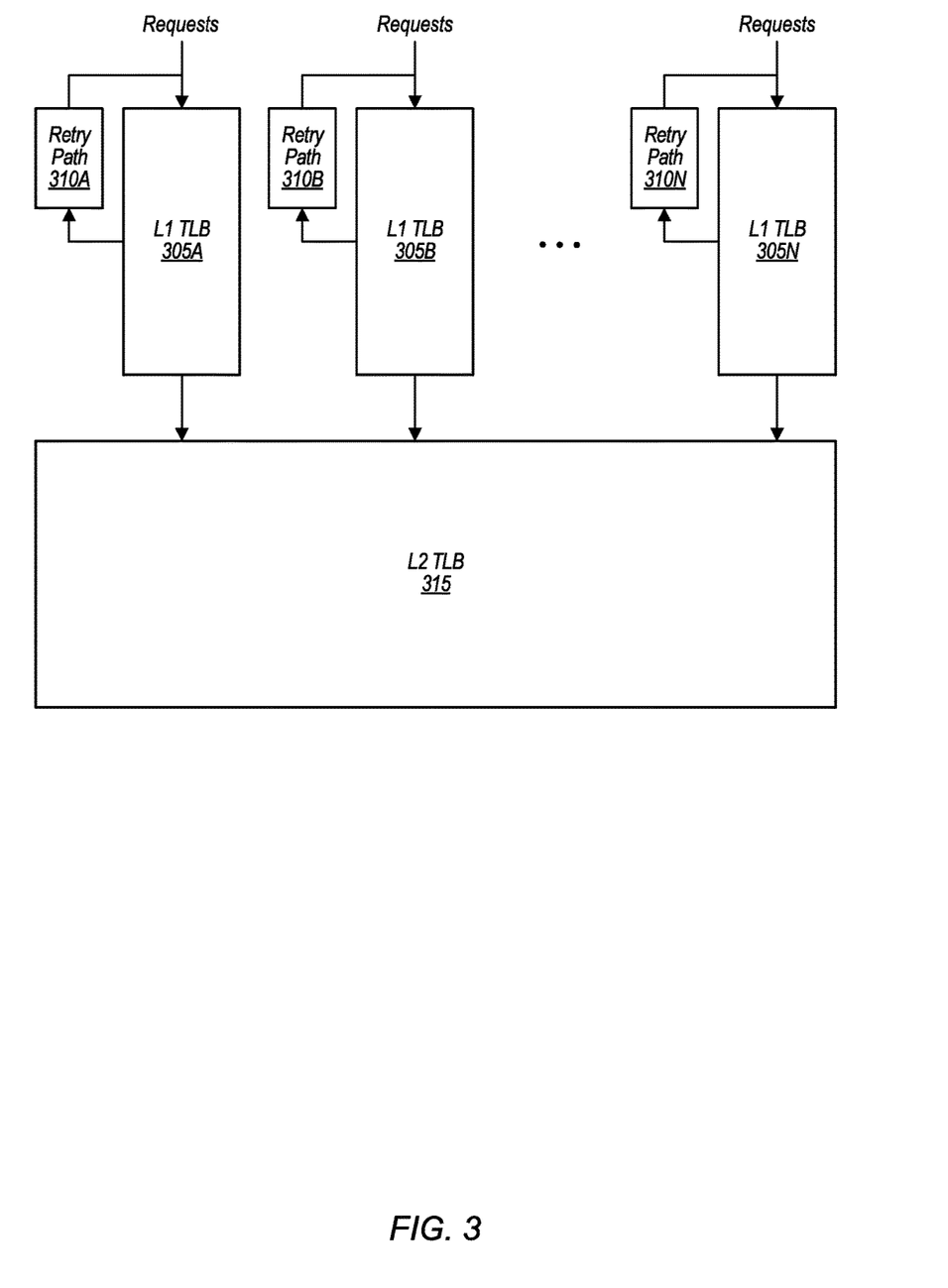
FIG. 3 is a block diagram of one embodiment of multiple L1 TLBs coupled to a shared L2 TLB.

Referring now to FIG. 3, a block diagram of one embodiment of multiple L1 TLBs 305A-N coupled to a shared L2 TLB 315 is shown. In one embodiment, a separate L1 TLB 305A-N is utilized by each client on a per-client basis. Accordingly, in this embodiment, a first client (e.g., GPU) is coupled to L1 TLB 305A, a second client (e.g., CPU) is coupled to L1 TLB 305B, and so on. Requests that miss in a lookup of one of L1 TLB 305A-N are forwarded to L2 TLB 315. An entry is allocated for a request when the request misses in the lookup of the L1 TLB. Also, a default page size is specified for the entry based on which page size is predicted to be targeted by the request. In one embodiment, the default page size that is specified is based on the client which generated the request. For example, in one embodiment, a first default page size is specified for a first client, a second default page size is specified for a second client, and so on. However, in some cases, the default page size specified for a given request will not match the actual page size targeted by the given request. Accordingly, each L1 TLB 305A-N includes a corresponding retry path 310A-N for requests which are retried in response to the default page size not matching the actual page size targeted by the requests.

Figure 4:
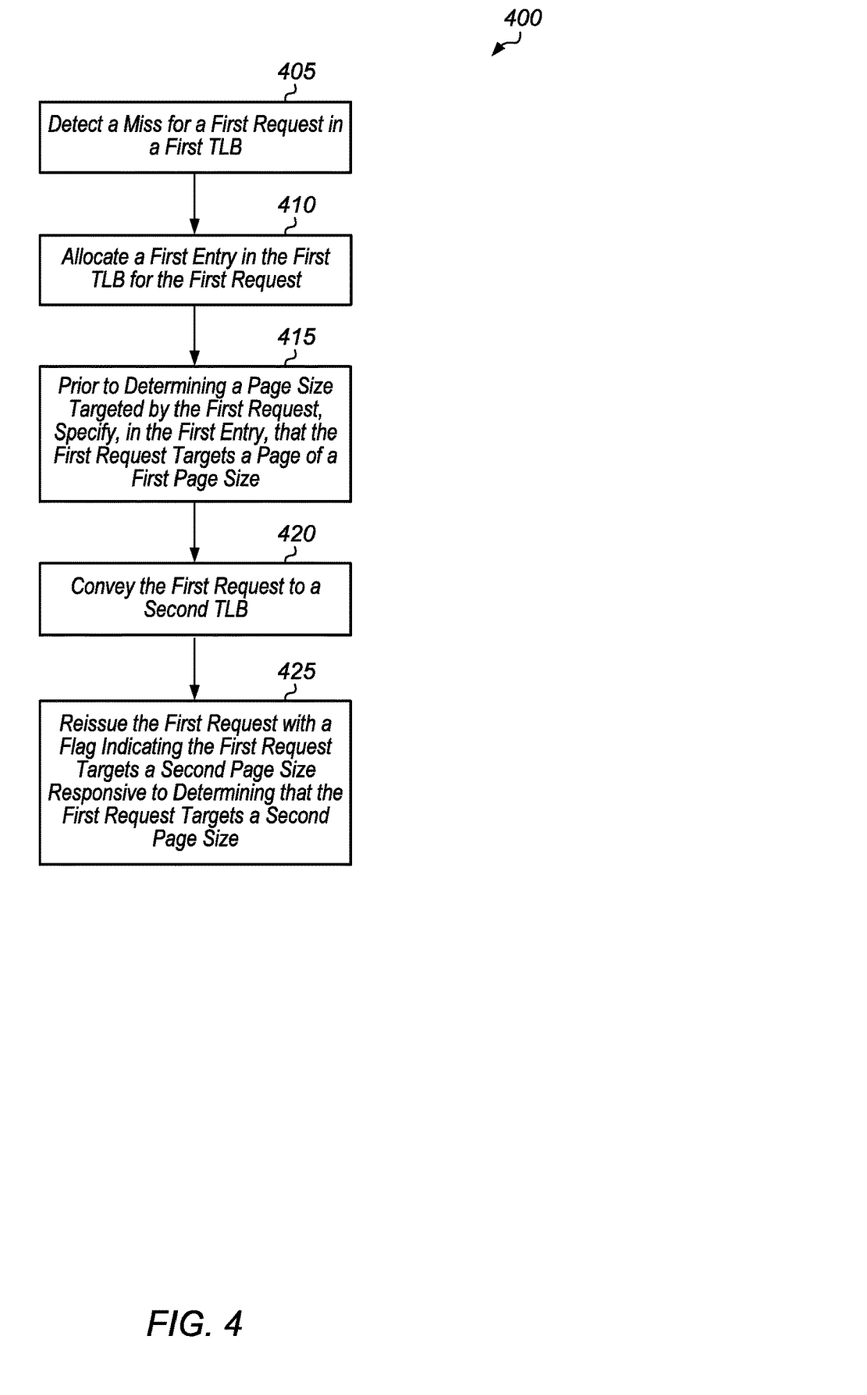
FIG. 4 is a generalized flow diagram illustrating one embodiment of a method for selecting a large page size as the default page size for a variable page size TLB.
Figure 5:
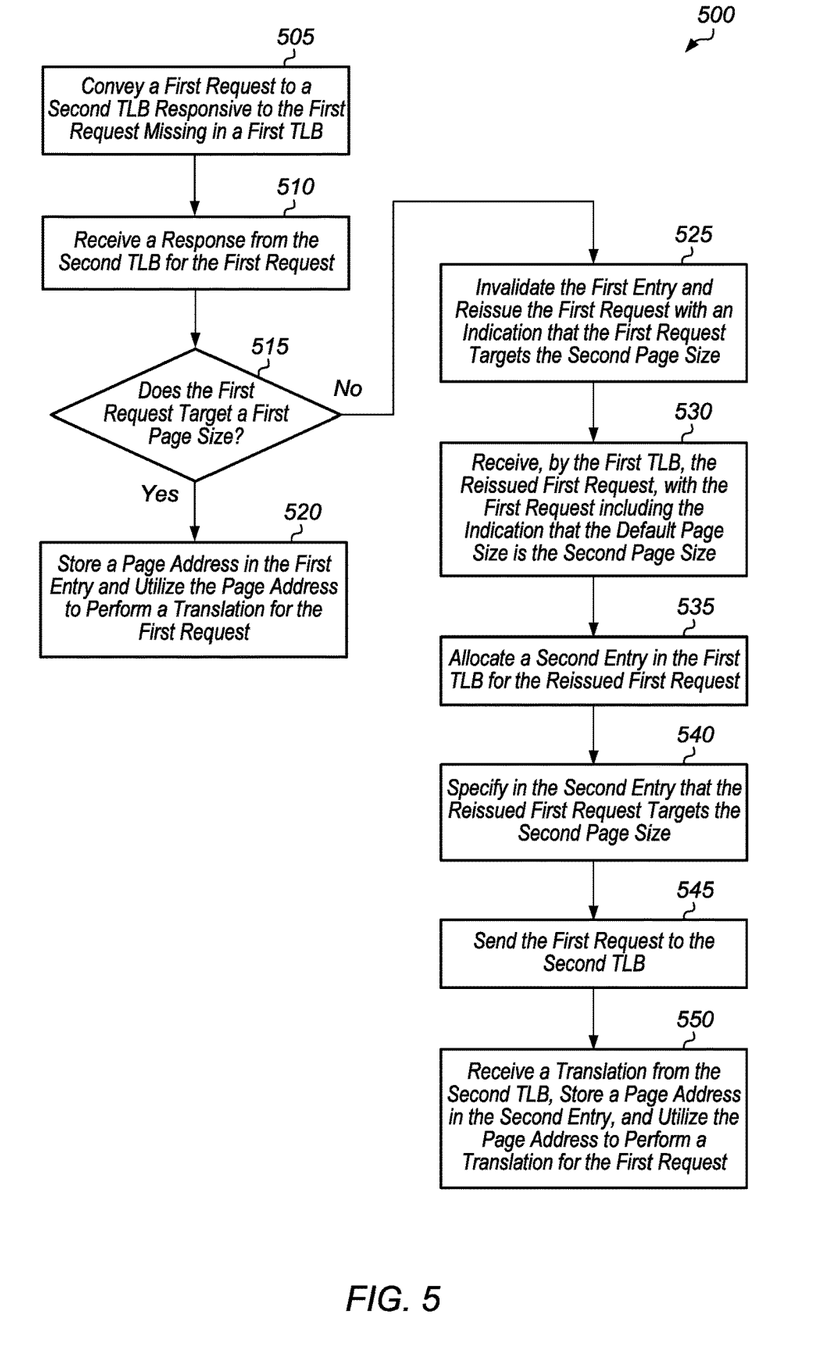
FIG. 5 is a generalized flow diagram illustrating one embodiment of a method for processing a miss in a first TLB.
Figure 6:
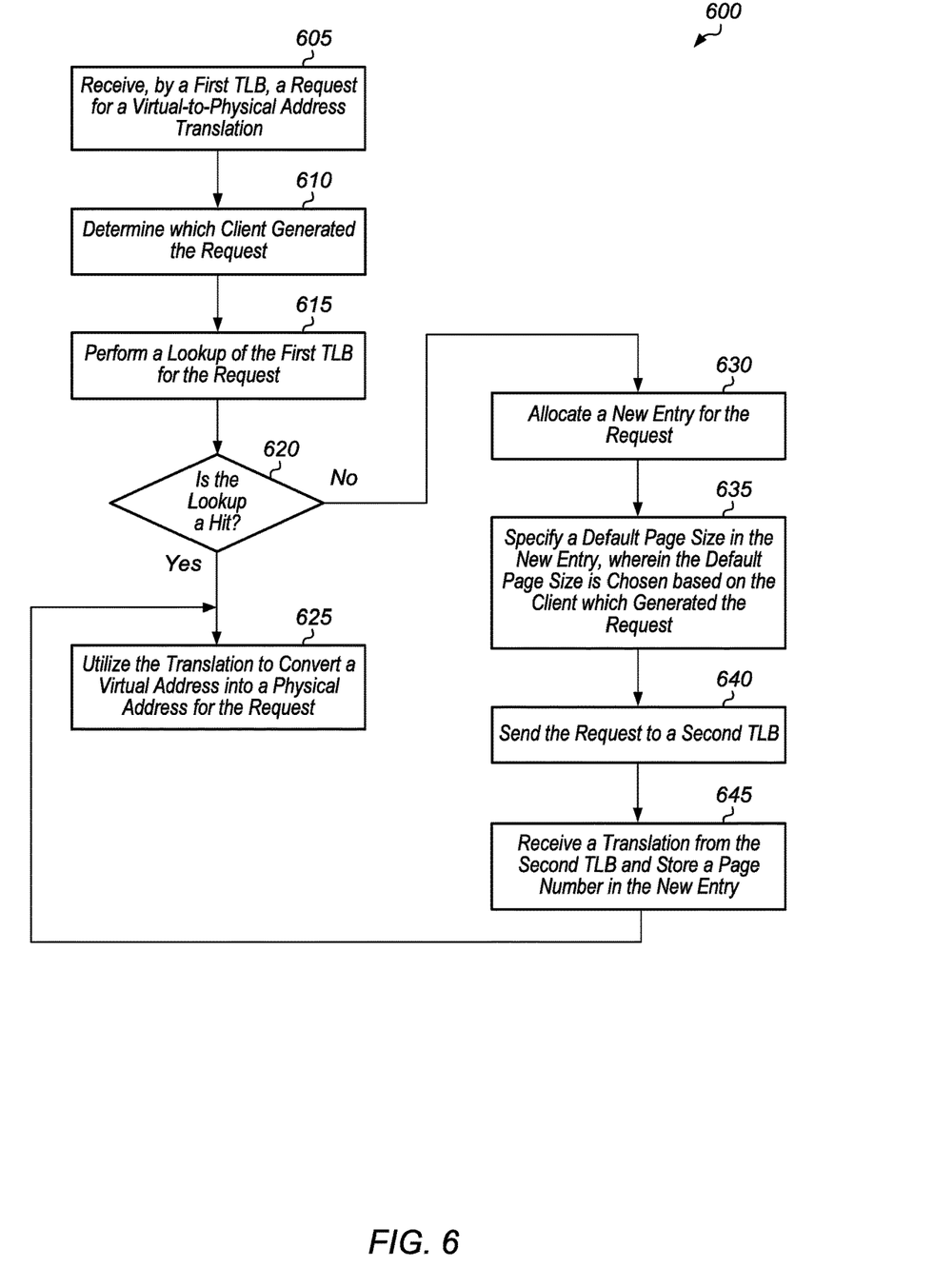
FIG. 6 is a generalized flow diagram illustrating one embodiment of a method for determining a default page size based on a client of a request.
Figure 7:
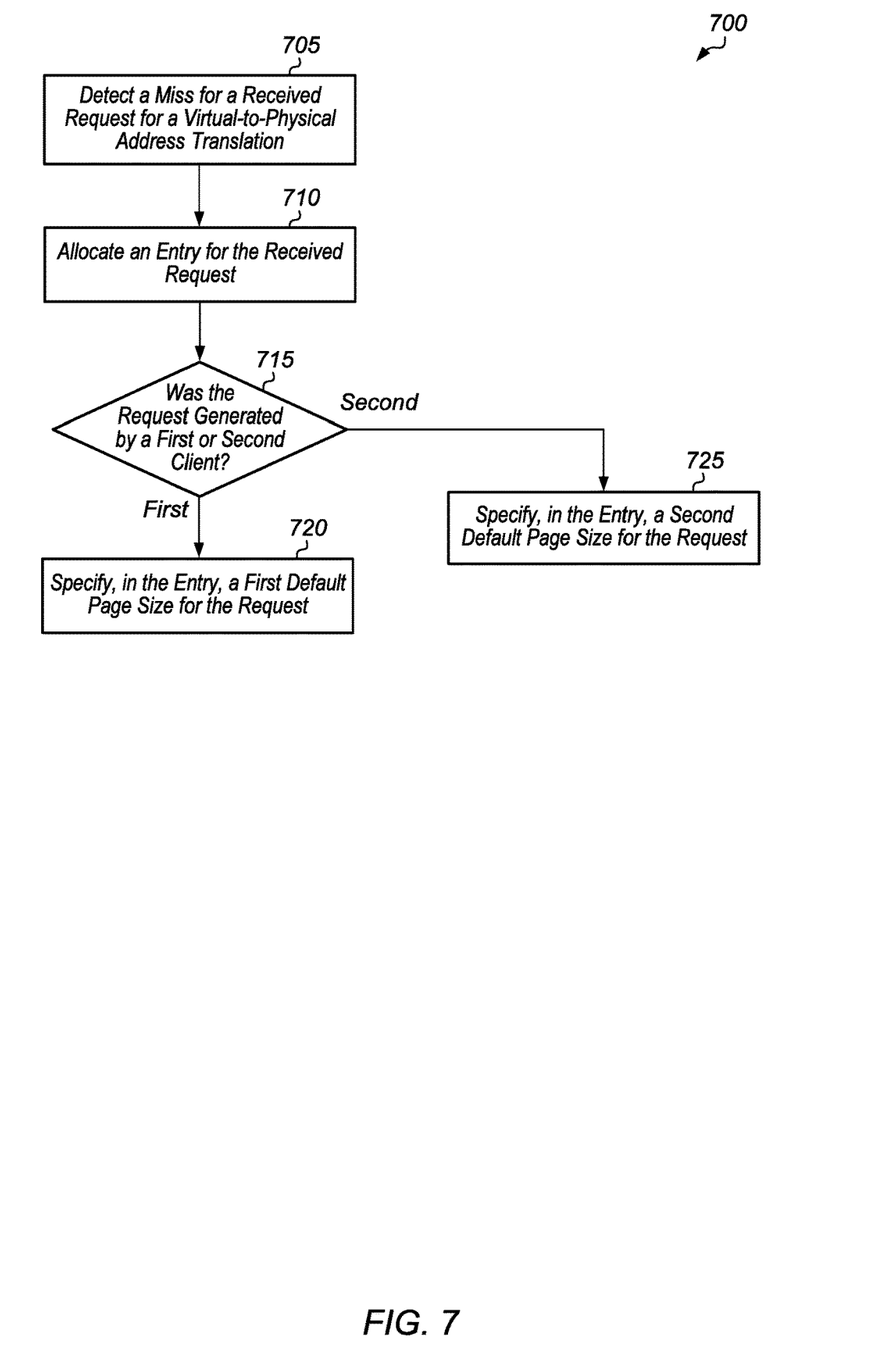
FIG. 7 is a generalized flow diagram illustrating one embodiment of a method for determining a default page size based on a client of a request.

Turning now to FIG. 4, one embodiment of a method 400 for selecting a large page size as the default page size for a variable page size TLB is shown. For purposes of discussion, the steps in this embodiment and those of FIGS. 5-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A miss is detected for a first request in a first TLB (block 405). In one embodiment, a computing system (e.g., system 100 of FIG. 1) includes at least one processor, a TLB complex which includes the first TLB, and a memory subsystem. The system can also include any number of other components depending on the embodiment. In one embodiment, the TLB complex also includes a second TLB. It is assumed for the purposes of this discussion that the first request includes a first virtual address. The first TLB is configured to convert the first virtual address into a first physical address where the data targeted by the first request is located in the memory subsystem of the computing system.

Responsive to detecting the miss for the first request in the first TLB, a first entry is allocated in the first TLB for the first request (block 410). Prior to determining a page size targeted by the first request, the first TLB specifies, in the first entry, that the first request targets a page of a first page size (block 415). In one embodiment, the first TLB specifies that the first request targets a page of a first page size by setting a field in the first entry to a value which specifies the first page size. In one embodiment, the first page size is a largest of the plurality of page sizes stored by the memory subsystem.

Next, the first TLB conveys the first request to a second TLB (block 420). The lookup of the second TLB (or a subsequent table walk if the lookup of the second TLB misses) will determine if the first request actually targets a page of the first page size and will retrieve a translation for converting the first virtual address of the first request into a corresponding page address. After block 420, the first TLB reissues the first request with a flag indicating the first request targets a second page size responsive to determining that the first request targets a second page size (block 425). It is assumed for the purposes of this discussion that the second page size is different from the first page size. After block 425, method 400 ends. It is noted that additional steps that are performed responsive to determining that the first request targets the second page size are described below in the discussion regarding method 500 (of FIG. 5).

Referring now to FIG. 5, one embodiment of a method 500 for processing a miss in a first TLB is shown. A first TLB conveys a first request to a second TLB responsive to the first request missing in a first TLB (block 505). In one embodiment, the first TLB is a L1 TLB and the second TLB is a L2 TLB. It is noted that the term "second TLB" can also refer to a "page table walker" or a "memory management unit" in some embodiments. It is assumed for the purposes of this discussion that a first entry has been created in the first TLB for the first request and that the first entry indicates the first request targets a first page size. The first entry can specify that the first request targets the first page size even though the first TLB has not yet determined which page size is targeted by the first request. In one embodiment, the default page size selected for the first request is the largest possible page size for the memory subsystem of the host computing system. This allows the logic in the first TLB to consolidate entries and reduce the number of requests sent to the second TLB. Additionally, some clients are likely to use a certain page size for the majority of requests, and for these clients, the first TLB can predict the page size targeted by a request with a high degree of confidence.

At a later point in time, the first TLB receives a response from the second TLB for the first request (block 510). If the second TLB confirms that the first request targets the first page size (conditional block 515, "yes" leg), then the first TLB stores a page address in the first entry and utilizes the page address to perform a translation for the first request (block 520). After block 520, method 500 ends.

On the other hand, if the response from the second TLB indicates that the first request targets a second page size (conditional block 515, "no" leg), then the first TLB invalidates the first entry and reissues the first request with an indication that the first request targets the second page size (block 525). In one embodiment, the first request is issued on a retry path that conveys the first request back to the input of the first TLB. It is assumed for the purposes of this discussion that the second page size is different from the first page size.

Next, the reissued first request is received by the first TLB, with the first request including the indication that the default page size is the second page size (block 530). Then, a second entry is allocated in the first TLB for the reissued first request (block 535). The first TLB specifies in the second entry that the reissued first request targets the second page size (block 540). Next, the first request is sent to the second TLB (block 545). At a later point in time, a translation is received from the second TLB, a page address is stored in the second entry, and the page address is utilized to perform a translation the first request (block 550). After block 550, method 500 ends.

Turning now to FIG. 6, one embodiment of a method 600 for determining a default page size based on a client of a request is shown. A first TLB receives a request for a virtual-to-physical address translation (block 605). In response to receiving the request, the first TLB determines which client generated the request (block 610). In one embodiment, the request includes an indicator to specify which client generated the request. In another embodiment, the first TLB determines the client based on the virtual address of the request. For example, a first client targets a first region of the virtual address space, a second client targets a second region of the virtual address space, and so on. It is noted that each client can be a separate component within the computing system. In this embodiment, a client can be a graphics client (e.g., GPU), a CPU, an I/O device, or another component. In another embodiment, each client is a separate software application, thread, process, or other software entity. In a further embodiment, each client is a separate guest virtual machine (VM) or hypervisor. Also, any combination of the above embodiments can be utilized together in a single embodiment to identify multiple different types of clients and utilize corresponding default page sizes. Other types of clients are possible and are contemplated.

Next, a lookup of the first TLB is performed for the request (block 615). If the lookup results in a hit (conditional block 620, "yes" leg), then the first TLB utilizes the translation to convert a virtual address into a physical address for the request (block 625). After block 625, method 600 ends. If the lookup results in a miss (conditional block 620, "no" leg), then the first TLB allocates a new entry for the request (block 630). The first TLB specifies a default page size in the new entry, wherein the default page size is based on the client which generated the request (block 635). For example, the first TLB specifies a first default page size in the new entry if a first client generated the request whereas if a second client generated the request, the first TLB specifies a second default page size in the new entry, wherein the second default page size is different from the first default page size. Next, the first TLB sends the request to a second TLB (block 640). At a later point in time, the first TLB receives a translation back from the second TLB and stores a physical page number in the new entry (block 645). Then, the first TLB utilizes the translation to convert a virtual address into a physical address for the request (block 625).

It is noted that it is assumed for the purposes of this discussion that the second TLB confirms that the default page size chosen for the request matches the actual page size targeted by the request. Blocks 525-550 of method 500 describe one example of a technique for handling the case when the actual page size targeted by the request does not match the default page size chosen for the request.

Referring now to FIG. 7, one embodiment of a method 700 for determining a default page size based on a client of a request is shown. A first TLB detects a miss for a received request for a virtual-to-physical address translation (block 705). The first TLB allocates an entry for the received request (block 710). If the request was generated by a first client (conditional block 715, "first" leg), then the first TLB specifies, in the entry, a first default page size for the request (block 720).

Otherwise, if the request was generated by a second client (conditional block 715, "second" leg), then the first TLB specifies, in the entry, a second default page size for the request (block 725). It is assumed for the purposes of this discussion that the second default page size is different from the first default page size. After blocks 720 and 725, method 700 ends. It is noted that the entry can be invalidated if a second TLB indicates that the request targets a page size which is different from the default page size specified in the entry. This embodiment is described in more detail above in the discussion regarding method 500 of FIG. 5. It is also noted that conditional block 715 can include any number of other legs for any number of other clients of the computing system. For example, a third client can have a third default page size, a fourth client can have a fourth default page size, and so on. It should be understood that different clients can have the same default page size. For example, a third client can have the first default page size, which is the same default page size specified for requests generated by the first client.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   at least one processor;
   a memory subsystem which stores a plurality of page sizes; and
   a first translation lookaside buffer (TLB) comprising a plurality of entries;
   wherein the first TLB is configured to:
      allocate a first entry of the TLB responsive to detecting a miss for a first address translation request, wherein the first address translation request is generated by a first processor;
      prior to determining a page size targeted by the first address translation request, specify, in the first entry, that the first request targets a page of a first page size in the memory subsystem; and
      responsive to determining that the first address translation request targets a second page size different from the first page size, reissue the first address translation request to the first TLB with an indication that the first address translation request targets the second page size.

2. The system as recited in claim 1, wherein the system further comprises a second TLB, wherein the first TLB is configured to convey the first address translation request to the second TLB responsive to detecting the miss for the first address translation request.

3. The system as recited in claim 2, wherein the second TLB is configured to determine that the first address translation request targets the second page size.

4. The system as recited in claim 3, wherein the first TLB is further configured to:
   invalidate the first entry responsive to determining the first address translation request targets the second page size;
   allocate a second entry of the first TLB responsive to detecting the first address translation request being reissued; and
   specify, in the second entry, that the reissued first address translation request targets the second page size.

5. The system as recited in claim 1, wherein the first TLB is configured to:
   receive a second address translation request;
   determine a given default page size for the second address translation request based on which client generated the second address translation request; and
   allocate a second entry for the second address translation request, wherein the second entry specifies the given default page size.

6. The system as recited in claim 5, wherein requests generated by a first client have a first default page size, wherein requests generated by a second client have a second default page size, and wherein the second default page size is different from the first default page size.

7. The system as recited in claim 1, wherein the first page size is larger than the second page size.

8. A method comprising:
   allocating a first entry of a first translation lookaside buffer (TLB) responsive to detecting a miss for a first address translation request;
   prior to determining a page size targeted by the first address translation request, specifying, in the first entry, that the first address translation request targets a page of a first page size; and
   responsive to determining that the first address translation request targets a second page size different from the first page size, the first TLB reissuing the first address translation request to the first TLB with an indication that the first address translation request targets the second page size.

9. The method as recited in claim 8, further comprising conveying the first address translation request to a second TLB responsive to detecting the miss for the first address translation request.

10. The method as recited in claim 9, further comprising determining, by the second TLB, that the first address translation request targets the second page size.

11. The method as recited in claim 10, further comprising:
invalidating the first entry responsive to determining the first address translation request targets the second page size;
allocating a second entry of the first TLB responsive to detecting the first address translation request being reissued; and
specifying, in the second entry, that the reissued first address translation request targets the second page size.

12. The method as recited in claim 8, further comprising:
receiving a second address translation request;
determining a given default page size for the second address translation request based on which client generated the second address translation request; and
allocating a second entry for the second address translation request, wherein the second entry specifies the given default page size.

13. The method as recited in claim 12, wherein requests generated by a first client have a first default page size, wherein requests generated by a second client have a second default page size, and wherein the second default page size is different from the first default page size.

14. The method as recited in claim 8, wherein the first page size is larger than the second page size.

15. An apparatus comprising:
a first translation lookaside buffer (TLB); and
a second TLB;
wherein the first TLB is configured to:
    allocate a first entry of the TLB responsive to detecting a miss for a first address translation request, wherein the first address translation request is generated by a first processor;
    prior to determining a page size targeted by the first address translation request, specify, in the first entry, that the first request targets a page of a first page size in the memory subsystem; and
    responsive to determining that the first address translation request targets a second page size different from the first page size, reissue the first address translation request to the first TLB with an indication that the first address translation request targets the second page size.

16. The apparatus as recited in claim 15, wherein the first TLB is configured to convey the first address translation request to the second TLB responsive to detecting the miss for the first address translation request.

17. The apparatus as recited in claim 16, wherein the second TLB is configured to determine that the first address translation request targets the second page size.

18. The apparatus as recited in claim 17, wherein the first TLB is further configured to:
invalidate the first entry responsive to determining the first address translation request targets a second page size;
allocate a second entry responsive to detecting the first address translation request being reissued; and
specify, in the second entry, that the first address translation request targets the second page size.

19. The apparatus as recited in claim 15, wherein the first TLB is configured to:
receive a second address translation request;
determine a given default page size for the second address translation request based on which client generated the second address translation request; and
allocate a second entry for the second address translation request, wherein the second entry specifies the given default page size.

20. The apparatus as recited in claim 19, wherein requests generated by a first client have a first default page size, wherein requests generated by a second client have a second default page size, and wherein the second default page size is different from the first default page size.

* * * * *